United States Patent
Wang et al.

(10) Patent No.: US 9,967,128 B2
(45) Date of Patent: May 8, 2018

(54) TR069 PROTOCOL MANAGEMENT METHOD ORIENTED TO WIA-PA NETWORK

(71) Applicant: Chongqing University of Posts and Telecommunications, Chongqing (CN)

(72) Inventors: Ping Wang, Chongqing (CN); Heng Wang, Chongqing (CN); Xiaoyuan Xu, Chongqing (CN); Ji Zou, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days. days.

(21) Appl. No.: 15/512,295

(22) PCT Filed: Mar. 29, 2016

(86) PCT No.: PCT/CN2016/077763
§ 371 (c)(1),
(2) Date: Mar. 17, 2017

(87) PCT Pub. No.: WO2016/155611
PCT Pub. Date: Oct. 6, 2016

(65) Prior Publication Data
US 2018/0013606 A1    Jan. 11, 2018

(30) Foreign Application Priority Data

Apr. 2, 2015    (CN) .......................... 2015 1 0155046

(51) Int. Cl.
*H04B 7/00* (2006.01)
*H04L 29/06* (2006.01)
(Continued)

(52) U.S. Cl.
CPC ........... *H04L 29/06* (2013.01); *H04W 84/045* (2013.01); *H04W 88/08* (2013.01); *H04W 36/22* (2013.01); *H04W 88/18* (2013.01); *H04W 92/20* (2013.01)

(58) Field of Classification Search
CPC ... H04W 84/045; H04W 88/08; H04W 36/22; H04W 88/18; H04W 92/20; H04L 29/06
See application file for complete search history.

(56) References Cited

U.S. PATENT DOCUMENTS

2002/0126642 A1*  9/2002  Shitama .................. H04L 29/06
                                                       370/338
2010/0054266 A1*  3/2010  Bouchat .............. H04L 12/2809
                                                       370/401
(Continued)

FOREIGN PATENT DOCUMENTS

CN    102136934 A    7/2011
CN    103491058 A    1/2014
(Continued)

OTHER PUBLICATIONS

The World Intellectual Property Organization (WIPO) International Search Report for PCT/CN2016/077763 dated Jun. 14, 2016 5 Pages.

*Primary Examiner* — Dominic Rego
(74) *Attorney, Agent, or Firm* — Anova Law Group, PLLC

(57) ABSTRACT

The present invention claims a TR069 protocol management method oriented to a WIA-PA network, where a traditional TR069 network management system architecture is improved to extend a TR069 protocol only oriented to Internet terminal device management in an initial design from the Internet to a WIA-PA wireless sensor network; a session connection interaction process between an ACS and a CPE is expanded to establish a session connection between
(Continued)

the ACS and a WIA-PA network node; a virtual device mechanism is designed by taking a WIA-PA network gateway as the CPE to store a TR069 data model and proxy device information corresponding to a WIA-PA data model and implement the TR069 protocol to manage the WIA-PA network node in a manner as simple and transparent as that for an interaction between the ACS and the common CPE; a management data model mapping mechanism is designed to establish a correlation from the WIA-PA data model described in TR069 to a standard WIA-PA data model; and a protocol conversion interlace is designed to implement the conversion between a TR069 RPC method and a WIA-PA network management command frame. The TR069 protocol management method has a good reference value for the implementation of the M2M management of the whole network as well as the application and development of the TR069 protocol oriented to the wireless sensor network.

4 Claims, 4 Drawing Sheets

(51) Int. Cl.
*H04W 84/04* (2009.01)
*H04W 88/08* (2009.01)
H04W 92/20 (2009.01)
H04W 36/22 (2009.01)
H04W 88/18 (2009.01)

(56) References Cited

U.S. PATENT DOCUMENTS

| | | | |
|---|---|---|---|
| 2010/0196006 A1* | 8/2010 | Lin | H04L 12/287 398/58 |
| 2010/0272057 A1* | 10/2010 | Chen | H04L 41/08 370/329 |
| 2012/0264470 A1 | 10/2012 | Bajj | |
| 2015/0063336 A1* | 3/2015 | Cherian | H04W 76/025 370/338 |
| 2016/0329980 A1* | 11/2016 | Zheng | H04Q 11/0067 |

FOREIGN PATENT DOCUMENTS

| | | |
|---|---|---|
| CN | 103974140 A | 8/2014 |
| CN | 104734893 A | 6/2015 |

\* cited by examiner

TR069 PROTOCOL MANAGEMENT METHOD ORIENTED TO WIA-PA NETWORK

BACKGROUND OF THE INVENTION

Technical Field

The present invention relates to the technical field of industrial wireless sensor networks, and in particular to a TR069 protocol management method oriented to a WIA-PA network.

Description of Related Art

An industrial wireless sensor network is a hotspot in the research technical field attracting much attention around the world. WIA-PA standards have become IEC international standards formally. As one of the three major international standards on the industrial wireless application, it has solved key technical problems such as real time, reliability and anti-jamming capability m the industrial wireless network. Along with the development of the application of the WIA-PA standards, the technology has become increasingly mature, and a WIA-PA wireless sensor network consists of a large amount of wireless sensor nodes and features limited resources, large-scale deployment, higher dynamic property and others. Moreover, in the wireless sensor network with limited resources, the network quality is typically uncertain due to low power consumption, node energy damaging, the network and link quality losses over the time and the like. Therefore, it is necessary to manage the WIA-PA wireless sensor network, maintain the network performance, and guarantee the reliability of the end-to-end communication of a link. Meanwhile, parameters related to the WIA-PA wireless sensor network nodes require to be set on line to meet the requirements for flexible system configuration. In the meantime, as the network develops rapidly, more and more node devices are introduced into the network, these devices require a user to log in an accessible management, interlace to complete basic configuration and real-time monitoring, therefore, no matter its initial installation or later running, the devices need to be managed and maintained, through the management interface. However, most of the devices at the present stage only provide a local management configuration interface at a local area side. This means that with more and more diverse devices needing to be installed at the user side, the manner of installing, managing, and maintaining the devices door to door by the device maintenance personnel will become a huge burden, resulting in low efficiency and high consumption of human resources.

The TR069 protocol is an XML-based remote premise equipment management protocol which is mainly oriented to an Internet home network terminal device, and with the deployment of the TR069 protocol, the work for installing, managing, and maintaining the devices by the maintenance personnel for the users can be reduced to a very large extent, thereby increasing the management efficiency. With a high intelligentization requirement and with good flexibility and expandability by referring to mature Web technology, the TR069 protocol is recognized, as the "gold standard" for remote management now, and has become an industry-leading device management solution. To implement the M2M (Machine-to-Machine) management for the entire network and the management service for the devices on the whole network, the management of the sensor node must be taken into consideration with respect to the TR069 protocol Searched documents are as follows:

(1) Method for Converting TR069 and UPnP Protocols and Home Network Terminal Management Method and System, Application (Patent) No.: 201210192840.3; Publication Date: Jan. 1, 2014.

Patent (1) implements the management of a home gateway by the TR069 at a wide area network side, and the management of a home network device terminal by the UPnP protocol in a home network of a local area network.

According to the Internet TR069 protocol above and the development requirements of the management technology for the WIA-PA wireless sensor network, as well as in-depth applications thereof in the respective fields, the present invention provides a TR069 protocol management method oriented to a WIA-PA network and is intended to extend the TR069 management protocol from the Internet to the WIA-PA wireless sensor network, so as to explore the remote management technology for the network system architecture and wide area network scope for implementing the convergence between the Internet and the WIA-PA network, and to study a management service mode integrating human and things as well as things and things.

BRIEF SUMMARY OF THE INVENTION

Specific to the defects in the prior art, an object of the present invention is to provide a TR069 protocol management method oriented to a WIA-PA network for improving the usability and manageability of a system and facilitating the rapid deployment of the WIA-PA network nodes, with a technical solution as follows: a TR069 protocol management method oriented to a WIA-PA network improves a TR069 remote management system architecture of the WIA-PA network, that is, TR069 protocol communication is employed between an automatic configuration server (ACS) and customer premise equipment (CPE), one ACS provides a service to one or more CPEs, and the protocol management method comprises the following steps:

101, a sensor node in the WIA-PA network is powered on to execute a network access process and transmits a Report Neighbor Information request to the CPE;

102, after receiving a Report Neighbor Information request command transmuted by the sensor node, the CPE looks up a physical address of a storage node via a network address carried by the Report Neighbor Information request command, employs a virtual device creation mechanism to create a virtual device for the sensor node according to the physical address, stores all the information of the sensor node and the basic information of the CPE to a data model of the virtual device, opens a connection to the ACS, transmits an Inform request message to the ACS, wherein the Inform request message carries parameter information of which a WIA-PA network manager connected with the ACS needs to be informed, comprised by the Report Neighbor Information request command;

103, after receiving the Inform request message, the ACS stores the relevant information of the virtual device after determining the presences of a WIA-PA network node corresponding to the virtual device of the CPE, and transmits an Inform response message to the CPE;

104, after receiving the Inform response message, the CPE transmits an empty HTTP POST data message to the ACS to allow the ACS to manage the node corresponding to the virtual device of the CPE;

105, after receiving the HTTP POST data message with an empty load, the ACS allocates resources for the corresponding WIA-PA network node by transmitting a TR069 management request message comprising a corresponding remote procedure call (RPC) method to the CPE according to node neighbor information carried by the Inform request message in Step 102;

106, after the CPE receives the corresponding TR069 management request message, the virtual device of the CPE converting the TR069 management request message into a corresponding WIA-PA network request command frame by establishing a management data model mapping mechanism and a protocol conversion interface and transmits the same to the WIA-PA network node;

107, the sensor node in the WIA-PA network receives as well as analyzes and processes a corresponding resource allocation, command, and then transmits a resource allocation result to the CPE in the form of a WIA-PA network response command frame;

108, after the CPE receives the corresponding WIA-PA network response command frame, the virtual, device of the CPE converts the WIA-PA network response command frame into a corresponding TR069 management response message through data model mapping and a protocol conversion interface and transmits the same to the ACS;

109, after the ACS receives the corresponding TR069 management response message, the management session process is ended, if the ACS still needs to manage the sensor node in the WIA-PA network, the ACS transmits the corresponding TR069 management request message to the CPE to repeat Step 106 to Step 109; and if the ACS does not need to manage the sensor node in the WIA-PA network, the ACS transmits an empty HTTP RESPONSE data message to the CPE;

110, after the CPE receives the HTTP RESPONSE data message with an empty load and if the CPE does not need to manage the ACS, the CPE considers that the session between the virtual device of the CPE and the ACS is ended, and then closes the connection with the ACS to end a session process for completing the TR069 protocol management of the WIA-PA network.

Further, the virtual device creation mechanism in Step 102 is specifically as follows: the virtual device needs to have a function equal to that of a TR069 client to provide a TR069 terminal of a WIA-PA network node on the CPE, for the ACS, that is, the CPE constructs and maintains one data model and data cache in the virtual device for each WIA-PA network node, and when the CPE initiates a connection to the ACS through one virtual device, the CPE is a wireless sensor network node corresponding to the virtual device with respect to the ACS; and the CPE receives the Report Neighbor information request, looks up a corresponding physical address in an address allocation table according to the network address carried by the Report Neighbor Information request, and identities whether a matching item exists in a virtual device table according to the physical address, if the matching item exists, the CPE considers the WIA-PA network node as a restart and only updates the TR069 data model information corresponding to the node instead of creating a new virtual device; and if the matching item does not exist, the CPE considers the WIA-PA network node as undergoing a first power-on, creates one virtual device, adds a description to a WIA-PA network node management information library in the TR069 protocol in die data model, and stores the proxy device information.

Further, the management data model mapping mechanism in Step 106 is specifically as follows: a WIA-PA data model and a standard WIA-PA data model as described in TR069, wherein the WIA-PA data model comprises a WIA-PA protocol stack layering management object, composing an application layer APS, a network layer NL, a MAC layer MAC, a physical layer PHY, a power management object POWER, an unstructured attribute object DMAP, a route table object Route Table, a super frame table object SfrTable, a link table object LinkTable, a neighbor table object NbrTable, a channel condition table object ChanConTable, a device table object Device Table, a VCR table object VcrTable, a device condition table object DevConTable, a key table object Key Table, and an object table object ObjectTable; and a mapping relation is established among layer structure character string name SensorNode.X_CQUPT_EDU_CN.A.B.C, WIA-PA object ID NO. A, WIA-PA table entry B, WIA-PA attribute ID No. C and WIA-PA attribute length as described by each object table XML, wherein table entry information, only exists in a structured attribute object.

Further, the protocol conversion interface in the steps is responsible for a protocol conversion involving a SetParameterValues method in the TR069 protocol and a WIA-PA Attribute Configuration request command frame, a GetParameterValues method and a WIA-PA Get Attribute request command frame, an AddObject method in combination with a SetParameterValues method, and WIA-PA Add or Update Route, Superframe, or Link request command frame, a DeleteObject method and a WIA-PA Delete Route request command frame, as well as a custom X_CQUPT_Sleep method and a WIA-PA Attribute Configuration and Sleep Execution request command frame.

The present invention has the following advantages of beneficial effects:

Compared with the current TR069 management protocol, the present invention expands the management scope to the WIA-PA wireless sensor network, effectively solves the difficulty in remote management of field devices in the WIA-PA wireless sensor network from a wide area network side of the Internet, significantly increases the management efficiency, reduces the work where local users and node device maintenance personnel go into the field of the WIA-PA wireless sensor network to manage and maintain the WIA-PA terminal sensor nodes, thereby increasing the system usability and manageability and facilitating the rapid deployment of the WIA-PA network node.

DETAILED DESCRIPTION OF THE INVENTION

The technical solution in an embodiment of the present invention will be described clearly and completely below in combination with the drawings in the embodiments of the present invention. The described embodiment is only one and not all of the embodiment s of the present invention.

I. Improvement of TR069 Management System Architecture

Figure 1:
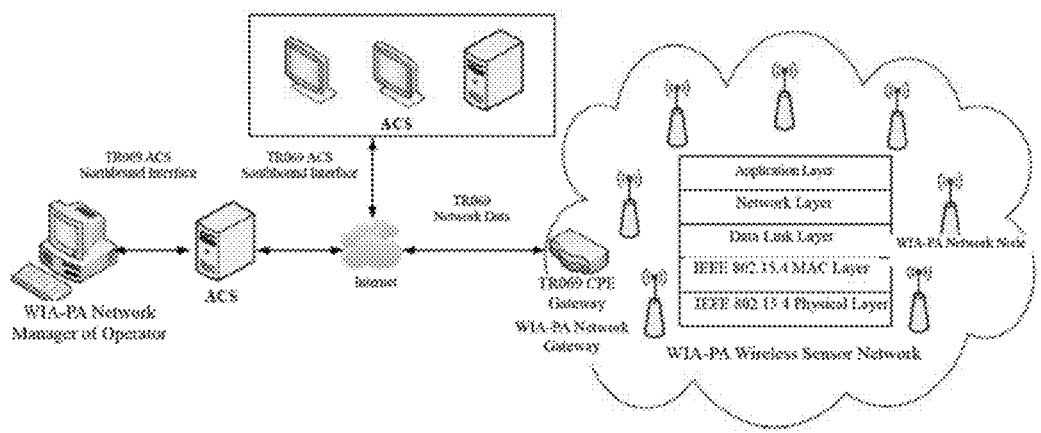
FIG. 1 is a diagram showing an improved TR069 remote management system architecture according to the present invention.

FIG. 1 shows an improved TR069 management system architecture, where the TR069 protocol is expanded and applied to the WIA-PA wireless sensor network to implement the configuration and management of the WIA-PA wireless sensor network. An ACS northbound interface which is connected with an ACS and a WIA-PA network manager is provided to a service provider for control, and meanwhile, is provided to a user in a portal website form for necessary accesses: and a southbound interface is connected with the ACS and a CPE to implement the management of the CPE by the ACS, and the ACS can perform unified management on a WIA-PA wireless sensor network governed by one or more CPEs.

Figure 2:
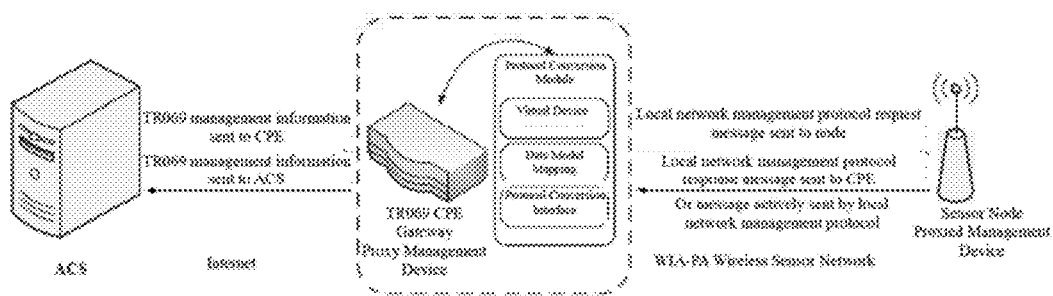
FIG. 2 is a diagram showing a TR069 proxy management structure according to the present invention.

The proxy management of the ACS to a WIA-PA network node is as shown in FIG. 2. A protocol conversion module is added in the CPE; and with the application of a virtual device, a management data model mapping mechanism and the protocol conversion interface, the management information interaction between the ACS and the CPE strictly follows the TR069 protocol, and the management information interaction between the CPE and the WIA-PA network node follows a WIA-PA wireless sensor network management protocol.

II. Establishment of a Session Connection

Figure 3:
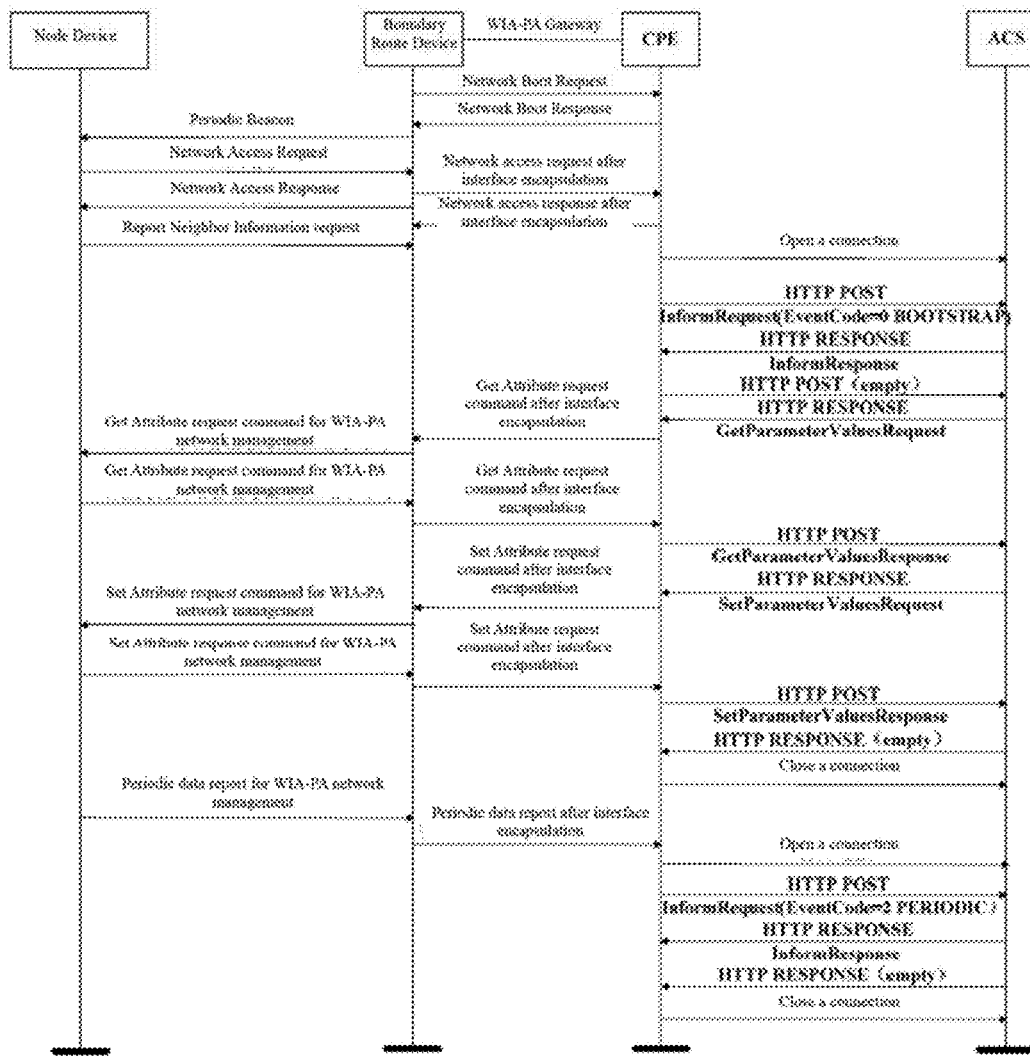
FIG. 3 is a diagram showing flow directions in the TR069 proxy management according to the present invention.
Figure 4:
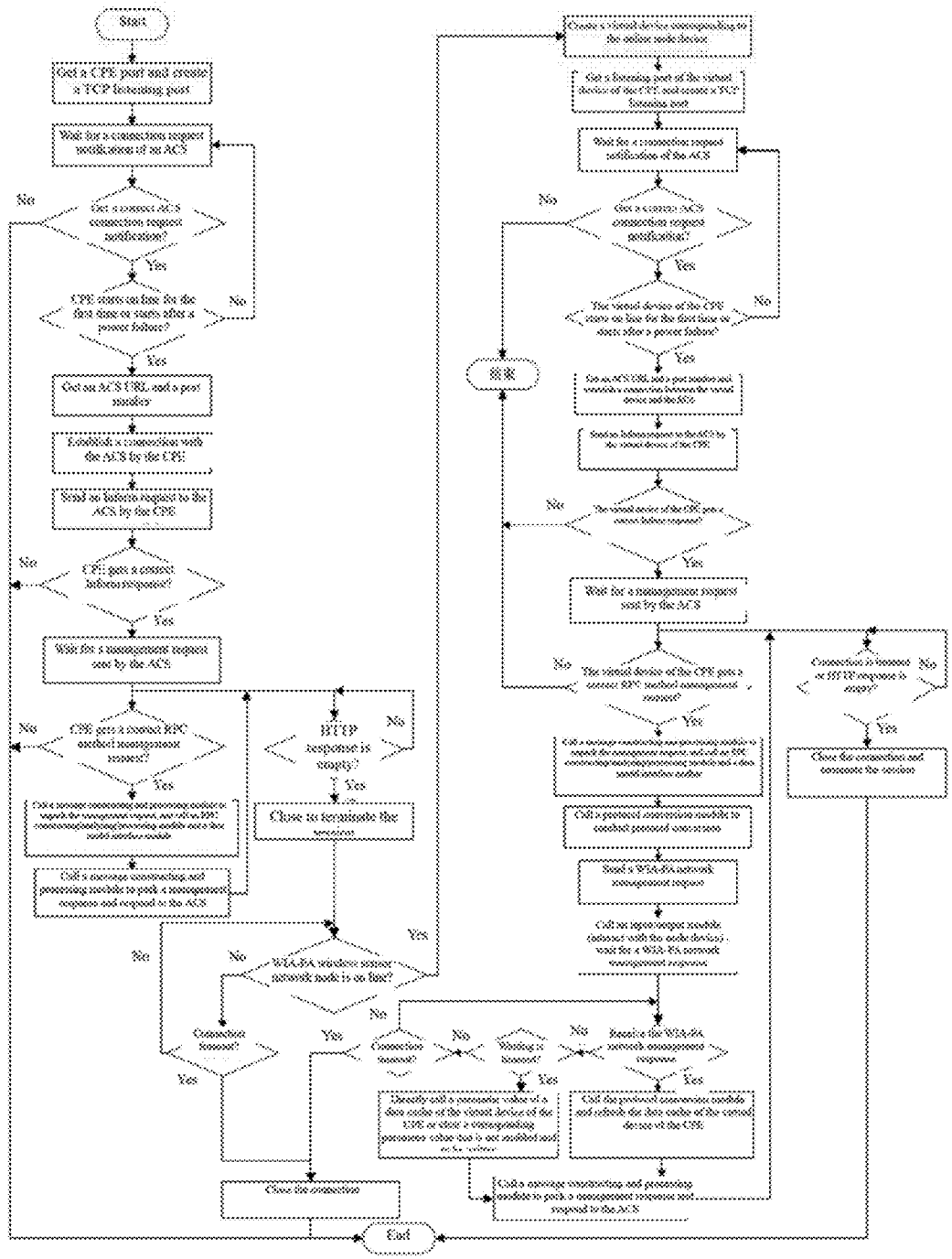
FIG. 4 is a flowchart showing TR069 proxy management procedures according to the present invention.

The present invention designs a session connection establishment process for the ACS, CPE, and WIA-PA network node in combination with the standards in the TR069 protocol. In a session establishment and interaction process between the ACS and the WIA-PA network node, the ACS and the CPE remain, connected. FIG. 3 demonstrates a complete information interaction process where the proxy management is performed on the WIA-PA network via the TR069 protocol; and FIG. 4 describes the flowchart of the prosy management in detail.

1. After accessing a network successfully, the WIA-PA wireless sensor network node transmits a Report Neighbor Information request to the CPE to request the CPE to perform the proxy work. Upon receiving a neighbor information request message, the CPE creates a virtual device for this node, and adds a data model of the WIA-PA network node in a TR069 management data model; and meanwhile, the CPE stores the basic information of the CPE in the virtual device and establishes a mapping relation between the TR069 data model and the data model of the WIA-PA network node.

2. The virtual deuce of the CPE creates a TCP listening port according to an obtained listening port number, and receives a connection request notification message transmitted by the ACS. When the CPE obtains the correct connection request notification message and is in an idle status at present, the IP address and port number of the ACS are obtained according to a default ACS URL, and a TCP connection is established between the CPE virtual device and the ACS. After the connection is established successfully, an Inform request message is transmitted to the ACS to wait, for a response of the ACS.

3. After waiting for a proper period of time, the virtual device actively closes the connection with the ACS and releases resources occupied by the current connection in case of still not receiving the Inform response message or receiving a wrong Inform response message. When the virtual device of the CPE receives a correct Inform, response message, the CPE virtual device transmits an HTTP POST data message with an empty load to the ACS, allowing the ACS to perform management.

4. Upon receiving the HTTP POST data message with the empty load, the ACS initiates a management request message and obtains a corresponding parameter value on the WIA-PA network node, if the WIA-PA network node needs to be managed. After the virtual device of the CPE receives the management request message transmitted by the ACS, the CPE analyzes the message with a message constructing and processing module and calls an RFC constructing/analyzing/processing module, calls a protocol conversion module (including the virtual device, a management data model mapping and a protocol conversion interface) according to a specific management content thereof to convert the received request message, forwards the converted request in conformity with the WIA-PA network management protocol to the corresponding WIA-PA network node, waits for a response message, sets a wait time, and operates the data caches of the virtual device in case of a timeout to return a corresponding TR069 response message.

Thereunto, when the type of a request for accessing the data model undergoes timeout, it is necessary to obtain the data value of a parameter to be accessed directly from the data caches of the virtual device, construct a corresponding TR069 response message and return the same to the ACS; and when the type of a request for writing the data model undergoes timeout, it is necessary to clear the data value (which is written in advance before protocol conversion but is not enabled) of a corresponding parameter ready to be modified in the data caches of the virtual device, construct a corresponding TR069 writing failure response message and return the same to the ACS.

5. The WIA-PA network node processes a management demand upon receiving the WIA-PA network management request message and transmits a response to the virtual device of the CPE. The CPE calls a protocol, conversion, module to covert a received response upon receiving a WIA-PA network management response message transmitted by the WIA-PA network node, refreshes the data caches of the virtual device, and transits the converted corresponding TR069 protocol response message to the ACS.

Thereunto, for the type of management for performing access operations on the data model, the refreshing of the date caches of the virtual device is to store the data value of a parameter returned, by the WIA-PA network in corresponding parameters of the data caches of the virtual device; and for the type of management for performing writing operations on the data model, the refreshing of the data caches of the virtual device is to enable tire data value of a parameter which is written in the data caches of the virtual device but is not enabled.

6. The ACS receives the corresponding TR069 management response message to complete one management interaction. If the ACS also needs to manage the WIA-PA network node, the ACS repeats Steps 4 to Step 6; and if the ACS does not need to manage the WIA-PA network node, the ACS transmits an empty HTTP RESPONSE data message to the CPE.

7. When the virtual device receives the HTTP RESPONSE data message with an empty content or the connection is timeout, the CPE knows that the session between the virtual device and the ACS is ended, and to avoid excessive connections with the ACS, the CPE actively closes the connection and releases resources occupied currently.

III. Creation of Virtual Device

Figure 5:
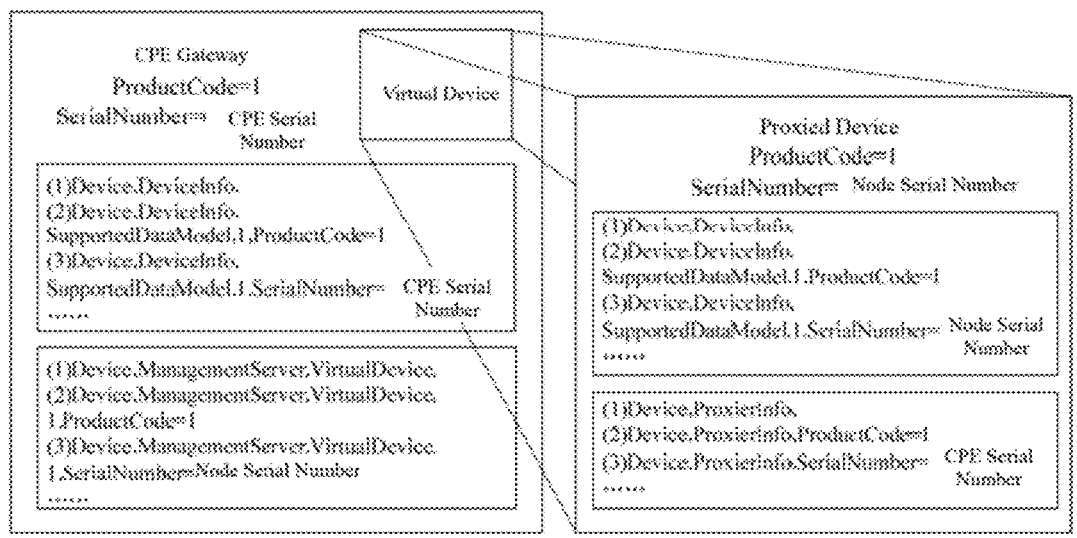
FIG. 5 is a diagram showing a storage relation between the CPE and a virtual device data model.

The CPE receives a Report Neighbor Information request command and determines to necessarily create a virtual device for a newly accessed WIA-PA node and add a description of the TR069 protocol to the data model of the WIA-PA network node. The CPE is responsible for establishing a DeviceInfo.SupportedDataModel data model table entry related thereto, and a DeviceInfo.SupportedDataModel data model table entry related to the WIA-PA network node is established by the virtual device created by the CPE. The CPE must provide a ManagementServer.VirtualDevice data model table entry to each WIA-PA network node proxied thereby, so that the ACS can use this table entry to recognize different WIA-PA network nodes proxied by the CPE. Meanwhile, the virtual device must provide a ProxierInfo data model table entry for the CPE thereof to store the necessary basic information of the CPE. A storage relation between the CPE and the virtual device data model is as shown in FIG. 5. The relation thereof is described as shown in the table below.

TABLE 1

Storage relation between the CPE and the virtual device data model

| CPE data model | Data model of virtual device n |
| --- | --- |
| CPE TR069 data model | TR069 data model of WIA-PA network node n |
| Basic information data model of virtual device 1-n | Basic information data model of CPE |

Meanwhile, a cache table entry of the data model is established in the virtual device of the CPE for data caching. When a data obtaining operation needs to be performed on the WIA-PA network node, the returned data is cached so that the data value can be obtained from the caches and returned to the ACS when the obtaining operation is performed on the WIA-PA network again next time but time, is out without a response. When a data setting, operation needs to be performed on the WIA-PA network node, the written data is cached, an enable identifier of a newly added cache table entry is set as not enabled; and when the response is received and indicates successful parameter setting, the enable identifier is modified into enable, and a response is constructed arid returned to the ACS.

IV. Management Date Model Mapping

A corresponding management data model mapping mechanism is designed to support a conversion from the WIA-PA data model to a standard WIA-PA data model as described in TR069. Mapping relations among the layer structure character string name, a WIA-PA object ID No., a WIA-PA table entry (possessed by a structured attribute object), a WIA-PA attribute ID NO. and a corresponding attribute length as described by the respective object tables XML are established.

The descriptions to a WIA-PA protocol stack layering management object (comprising an application layer APS, a network layer NL, a MAC layer MAC, and a physical layer PHY), a power management object POWER, an unstructured attribute object DMAP, and a structured attribute object (including a route table RouteTable, a superframe table SfrTable, a link table LinkTable, a neighbor table NbrTable, a channel condition table ChanConTable, a device table DeviceTable, a VCR table VcrTable, a device condition table DevConTable, a key table KeyTable, and an object table ObjectTable) is designed. Each of either an unstructured attribute object DMAP or a structured attribute object route table RouteTable is selected for an illustrative purpose, and the mapping relation thereof is as shown in the table below.

TABLE 2

Attribute mapping relation of unstructured attribute object DMAP described in TR069 protocol

| TR069 Parameter Name | SensorNode.X_CQUPT_EDU_CN.Dmap.Datasendisallowed |
| --- | --- |
| WIA-PA Object ID | DMAP_ATTRIBUTE_TABLE_ID (indicating a DMAP Object) |
| WIA-PA Attribute ID | 40 (indicating a periodic data transmission enable identifier attribute) |
| Attribute length | 1 (indicating the length of the periodic data transmission enable identifier) |

TABLE 3

Mapping relation of the route table object RouteTable attributes described in the TR069 protocol

| TR069 Parameter Name | SensorNode.X_CQUPT_EDU_CN.RouteTable.1.RouteID |
| --- | --- |
| WIA-PA Object ID | DMAP_ROUTE_TABLE_ID (indicating a RouteTable object) |
| WIA-PA Table Entry | 1 (derived from the TR069 parameter name, where the table needs to be looked up to get a specific index entry value) |
| WIA-PA Attribute ID | 0 (indicating a route ID attribute) |
| Attribute length | 2 (indicating the length of the route ID attribute) |

V. Protocol Conversion Interface

The protocol conversion interface is responsible for the protocol conversion between each RFC method called by the TR069 protocol and the corresponding WIA-PA management command frame. A TR069 protocol conversion interface method table is as shown in Table 4.

TABLE 4

TR069 protocol conversion interface method table

| TR069 RPC method | Description of RPC Method | Corresponding WIA-PA command frame |
| --- | --- | --- |
| Inform | Notification | Report Neighbor Information request command frame |

TABLE 4-continued

TR069 protocol conversion interface method table

| TR069 RPC method | Description of RPC Method | Corresponding WIA-PA command frame |
|---|---|---|
| SetParameterValues | Set a parameter value | Attribute Configuration request command frame |
| GetParameterValues | Get a parameter value | Get Attribute request command frame |
| AddObject + SetParameterValues | Add an object | Add Route request command frame<br>Update Route request command frame<br>Add Superframe request command frame<br>Update Superframe request command frame<br>Add Link request command frame<br>Update Link request command frame |
| DeleteObject | Delete an object | Delete Route request command frame<br>Delete Superframe request command frame<br>Delete Link request command frame |
| X_CQUPT_Sleep | Execute sleep | Attribute Configuration request command frame |

I. Inform Method

The CPE creates a virtual device and then establishes a session connection with the ACS at any time. Thereunto, the creating of the virtual device is triggered by a WIA-PA Report Neighbor Information request which is received by the CPE and is transmitted after the node accesses a network successfully. The virtual device corresponding to a wireless sensor network node is uniquely identified by a physical address of the node, and thus, the corresponding physical address recorded during short address allocation in the previous network access needs to be looked up with a network address in the Report Neighbor Information request.

In an Inform message transmitted by the virtual device, respective child elements to be modified are as follows:

(1) In a DeviceId element, a Manufacturer child element is a custom character string "CQUPT", an OUI child element is a "00+node network address"; a ProductClass child element is a "node type"; and a SerialNumber child element is a "node physical address".

(2) In an Event element, an EventCode child element is "0 BOOTSTRAP" in an Inform message transmitted after the virtual device is created. After one session between the device and the ACS is ended, the ACS actively initiates a connection to the virtual device of the CPE for access if the device does not lose connection, and the EventCode child element is "6 CONNECTION REQUEST" when the virtual device transmits the Inform message for establishing the session again. Thereunto, if the devices lose a connection (receiving no periodic data report for a period of time) the corresponding virtual device shall not be deleted but modified into whether an online identifier is offline. At this point, if the ACS imitates a connection to access the virtual device of the CPE, device offline can be learned by looking up this identifier, and an HTTP 503 error is returned. If the device is online again, the Inform message is transmitted to the ACS. At this point, the EventCode child element of this Inform message is "1 BOOT". Moreover, the CPE modifies the corresponding virtual device into whether the online identifier is online, and a new virtual device cannot be recreated.

(3) In view of the subsequent, proxy conversion of adding and updating the route, superframe and link command frame, for the WIA-PA network management protocol, at least the MaxEnvelope element should be set to two.

(4) A ParameterValueStruct name-value pair child element in a ParameterList element carries the basic information of the data model of the virtual device, and a message which is carried in the Report Neighbor Information request and needs to be provided to a WIA-PA network manager connected with the ACS. Thereunto, the information to be carried, in the Report Neighbor information request is neighbor address-link quality pair information.

2. SetParameterValues Method

The ACS configures one or more parameter values (structured parameter or unstructured parameter) of the WIA-PA wireless network node corresponding to the virtual device of the CPE with a SetParameterValues method, and converts the parameter(s) into a corresponding WIA-PA Attribute Configuration request command frame in the virtual device. Thereunto, a parameter name path included by a Name child element of the ParameterList element of a name-value pair ParameterValueStruct structure array of the SetParameterValues method corresponds to an Attribute Configuration request command frame attribute ID, an attribute member ID and a storage index value (for example, A. corresponds to an attribute A; A.1.B corresponds to an attribute member B of a structured attribute A with an index entry of 1; and A.1. corresponds to a table entry of the structured attribute A with an index entry of 1.); and the number of the ParameterValueStruct thereof corresponds to the number of the attribute required to be configured; and a Value child element value thereof corresponds to an attribute value required to be configured.

3. GetParameterValues Method

The ACS retrieves one or more parameter values (structured parameter or unstructured parameter) of the WIA-PA wireless network node corresponding to the virtual device of the CPE with a GetParameterValues method, and converts the parameter(s) into a corresponding WIA-PA Get Attribute request command frame in the virtual device. Thereunto, a parameter name path included by the Name child element of the ParameterName element of a string character string array of the GetParameterValues method corresponds to a Get Attribute request command frame attribute ID, an attribute member ID and a storage index value; and the number of the string thereof corresponds to the number of the attribute required to be get.

4. AddObject+SetParameterValues Method

The ACS establishes or updates the instance(s) of one or more objects in the virtual device of the CPE with an AddObject method, and converts the instance(s) into the corresponding WIA-PA add route, add superframe, and add link request command frames, as well as the corresponding WIA-PA update route, update superframe, and update link request command frames in the virtual device. With the operation on the route as an example, one or more route table entries are added or updated for the corresponding WIA-PA wireless network node.

An objectName child element called by the AddObject method is a character string variable, including an object name of the instance required to he established or updated. The ParameterKey child element called thereby is a character string variable, and can be set with a corresponding value to allow the ACS to be capable of recognizing that the instance is updated when accessing the instance next time, and the ParameterKey child element is generally empty.

An InstanceNumber child element called by an AddObjectResponse method is an unsigned integer variable, indicating an index number of a newly established or updated object instance. The index number is unique in this object.

The AddObject method is used in combination with the SetParameterValues method. If the instance required to be added does not exist in the virtual device of the CPE, one instance is added, which corresponds to the generation of an add route request command frame after the protocol conversion; if the instance required to be added exists, the parameter of the corresponding instance is updated, and an update route request command frame is generated (for example, if SensorNode.X_CQUPT_EDU_CN.RouteTable.1. does not exist, an instance 1 is added, which corresponds to the adding of a table entry 1 of a route table; and if SensorNode.X_CQUPT_CN.RouteTable.1. exists, the parameter of the table entry of the instance 1 is updated, which corresponds to the updating of the parameter of the table entry 1 of the route table.) Meanwhile, if the number of the name-value pair structure array ParameterValueStruct of the parameter required to be configured is n times the length of a single table entry of the object, n object instances are added or updated at a time.

5. DeleteObject Method

The ACS deletes particular instances of one or more particular objects in the virtual device of the CPE with a DeleteObject method, and converts the instance(s) into a delete route request delete superframe request, or delete link request command frames corresponding to the WIA-PA wireless sensor node in the virtual device. The delete route request is taken as an example.

The child element called by the DeleteObject method is the same as that of the AddObject method, where an object instance required to be deleted is stated. A Status child element called by a DeleteObjectResponse method is 0 or 1, indicating a status returned after the DeleteObject method is called successfully, where a status 0 indicates that the instance is deleted and applied, and a status 1 inmates the instance is deleted but not applied.

6. X_CQUPT_Sleep Method

In view of the limited node resources in the WIA-PA wireless sensor network, it is necessary to enable the node to enter sleep for reducing the energy consumption of the node when the continuous work of the node is not needed. The RPC method in the TR069 standards is expanded, and a custom X_CQUPT_Sleep method is added to implement remote control over the sleep execution of the node. The ACS implements the sleep of a particular node in the WIA-PA wireless sensor network with the X_CQUPT_Sleep method and the protocol conversion on tire virtual device of the CPE. Thereunto, the execution of a sleep command by a proxy protocol is implemented, by an Attribute Configuration request command frame.

The CommandKey child element called by the X_CQUPT_Sleep method is a string variable. After the wireless sensor network specifies that the sleeping node is awake, the corresponding virtual device of the CPE will include the value in the InfromStruct parameter of the Inform message when the Inform method is called again. The DelaySeconds child element thereof is an unsigned integer variable indicating a time interval (0 indicates no delay) from the time when the method is called to the time when the node starts sleep. The SleepTime child element is an unsigned integer variable specifying the time at which the node sleeps.

The Status child element value called in the X_CQUPT_SleepResponse method is 0 or 1, which indicates a status returned after the X_CQUPT_Sleep method is successfully called, with status 0 indicating that it is about to sleep and status 1 indicating that the sleep is unavailable at present.

The format of the body portion of an SOAP message of X_CQUPT_Sleep is as follows:

```
<cwmp:X_CQUPT_Sleep>
    <CommandKey>X</CommandKey>
    <DelaySeconds>Execute Sleep Delay Time</DelaySeconds>
    <SleepTime>Execute Sleep Time Interval</SleepTime>
</cwmp:X_CQUPT_Sleep>
```

The format of the body portion of the SOAP message of X_CQUPT_SleepResponse is as follows:

```
<cwpm:X_CQUPT_SleepResponse>
    <Status>0 or 1</Status>
</cwmp:X_CQUPT_SleepResponse>
```

The embodiments above shall be construed to illustrating the present invention only, instead of limiting the protection scope of the present invention. After reading the description of the present invention, those skilled in the art may make various variations or alternations to the present invention, and these equivalent changes or modifications shall likewise fall within the scope defined by the claims of the present invention.

What is claimed is:

1. A TR069 protocol management method oriented to a WIA-PA network, characterized in that a TR069 remote management system architecture of the WIA-PA network is improved, that is, TR069 protocol communication is employed between an automatic configuration server (ACS) and customer premise equipment (CPE), one ACS provides a service to one or more CPEs, and the protocol management method comprises the following steps:

101. a sensor node in the WIA-PA network is powered on to execute a network access process and transmits a Report Neighbor Information request to the CPE;

102. after receiving a Report Neighbor Information request command transmitted by the sensor node, the CPE looks up a physical address of a storage node via a network address carried by the Report Neighbor Information request command, employs a virtual device creation mechanism to create a virtual device for the sensor node according to the physical address, stores all the information of for sensor node and the basic information of the CPE to a data model of the virtual device, opens a connection to the ACS, transmits an Inform request message to the ACS, wherein the Inform request message carries parameter information of which a WIA-PA network manager connected with the ACS needs to be informed, comprised by the Report Neighbor Information request command;

103. after receiving the Inform request message, the ACS stores the relevant information of the virtual device after determining the presences of a WIA-PA network node corresponding to the virtual device of the CPE, and transmits an Inform response message to the CPE;

104. after receiving the Inform response message, the CPE transmits an empty HTTP POST data message to the ACS to allow the ACS 10 manage the node corresponding to the virtual device of the CPE;

105. after receiving the HTTP POST data message with an empty load, the ACS allocates resources for the corresponding WIA-PA network node by transmitting a TR069 management request message comprising a corresponding remote procedure call (RPC) method to the CPE according to the node neighbor information carried by the Inform request message in Step 102;

106. after the CPE receives the corresponding TR069 management request message, the virtual device of the CPE converting the TR069 management request message into a corresponding WIA-PA network request command frame by establishing a management data model mapping mechanism and a protocol conversion interface and transmits the same to the WIA-PA network node;

107. the sensor node in the WIA-PA network receives as well as analyzes and processes a corresponding resource allocation command, and then transmits a resource allocation result to the CPE in the form of a WIA-PA network response command frame;

108. after the CPE receives the corresponding WIA-PA network response command frame, the virtual device of the CPE converts the WIA-PA network response command frame into a corresponding TR069 management response message through data model mapping and a protocol conversion interface and transmits the same to the ACS;

109. after the ACS receives the corresponding TR069 management response message, the management session process is ended, if the ACS still needs to manage the sensor node in the WIA-PA network, the ACS transmits the corresponding TR069 management request message to the CPE to repeat Step 106 to Step 109; and if the ACS does not need to manage the sensor node in the WIA-PA network, the ACS transmits an empty HTTP RESPONSE data message to the CPE;

110. after the CPE receives the HTTP RESPONSE data message with an empty load and if the CPE does not need to manage the ACS, the CPE considers that the session between the virtual device of the CPE and the ACS is ended, and then closes the connection with tire ACS to end a session process for completing the TR069 protocol management of the WIA-PA network.

2. The TR069 protocol management method oriented to the WIA-PA network according to claim 1, characterized in that the virtual device creation mechanism in Step 102 is specifically as follows: the virtual device needs to have a function equal to that of a TR069 client to provide a TR069 terminal of a WIA-PA network node on the CPE, for the ACS, that is, the CPE constructs and maintains one data model and data cache in the virtual device for each WIA-PA network node, and when the CPE initiates a connection to the ACS through one virtual device, the CPE is a wireless sensor network node corresponding to the virtual device with respect to the ACS; and the CPE receives the Report Neighbor Information request, looks up a corresponding physical address in an address allocation table according to the network address carried by the Report Neighbor Information request, and identifies whether a matching item exists in a virtual device table according to the physical address, if tire matching item exists, the CPE considers the WIA-PA network node as a restart and only updates the TR069 data model information corresponding to the node instead of creating a new virtual device; and if the matching item does not exist, the CPE considers the WIA-PA network node as undergoing a first power-on, creates one virtual device, adds a description to the WIA-PA network node management information library in the TR069 protocol in the data model, and stores the proxy device information.

3. The TR069 protocol management method oriented to the WIA-PA network according to claim 1, characterized in that, the management data model mapping mechanism in Step 106 is specifically as follows: a WIA-PA data model and a standard WIA-PA data model as described in TR069, wherein, the WIA-PA data model comprises a WIA-PA protocol stack layering management object, comprising an application layer APS, a network layer NL, a MAC layer MAC, a physical layer PHY, a power management object POWER, an unstructured attribute object DMAP, a route table object Route Table, a super frame table object SfrTable, a link table object LinkTable, a neighbor table object NbrTable, a channel condition table object ChanConTable, a device table object Device Table, a VCR table object VcrTable, a device condition table object DevConTable, a key table object KeyTable, and an object table object ObjectTable; and a mapping relation is established among the layer structure character string name SensorNode.X_CQUPT_EDU_CN.A.B.C, WIA-PA object ID NO. A, WIA-PA table entry B, WIA-PA attribute ID No. C and WIA-PA attribute length as described by each object table XML, wherein table entry information only exists in a structured attribute object.

4. The TR069 protocol management method oriented to the WIA-PA network according to claim 1, characterized in that the protocol conversion interface in the steps is responsible for a protocol conversion involving a SetParameterValues method m the TR069 protocol and a WIA-PA Attribute Configuration request command frame, a GetParameterValues method and a WIA-PA Get Attribute request command frame, an AddObject method in combination with a SetParameterValues method and WIA-PA Add or Update Route, Superframe, or Link request command frame, a DeleteObject method and a WIA-PA Delete Route request command frame, as well as a custom X_CQUPT_Sleep method and a WIA-PA Attribute Configuration and Sleep Execution request command frame.

* * * * *